US007980604B2

(12) United States Patent
Punaro

(10) Patent No.: US 7,980,604 B2
(45) Date of Patent: Jul. 19, 2011

(54) BEARING PULLER

(76) Inventor: Michael J Punaro, Glen Allen, VA (US)

( * ) Notice: Subject to any disclaimer, the term of this patent is extended or adjusted under 35 U.S.C. 154(b) by 287 days.

(21) Appl. No.: 12/378,431

(22) Filed: May 9, 2009

(65) Prior Publication Data

US 2010/0281665 A1 Nov. 11, 2010

(51) Int. Cl.
*B23P 19/04* (2006.01)

(52) U.S. Cl. ............................ 292/258; 29/270; 29/278

(58) Field of Classification Search .................... 29/258, 29/244–257, 270, 271, 278, 280
See application file for complete search history.

(56) References Cited

U.S. PATENT DOCUMENTS 3,408,724 A * 11/1968 Hoeijenbos .................... 29/263
5,243,749 A * 9/1993 Shultz ............................ 29/263
RE36,009 E * 12/1998 Shultz ........................ 29/898.08
6,092,279 A * 7/2000 Shoup ............................ 29/724
6,266,859 B1 * 7/2001 Hernandez ...................... 29/256
6,601,277 B1 * 8/2003 Swanson ......................... 29/256
7,832,071 B2 * 11/2010 Klann ............................ 29/214

* cited by examiner

*Primary Examiner* — Lee D Wilson

(57) ABSTRACT

A novel and improved puller that provides a safe and efficient manner and tooling to remove bearings, bushings, gears, etc. The invention is simple and highly efficient is its design and use due to incorporating multiple design elements into the main collets or bearing adapters. My present invention uses a simple split collet machined accurately to precisely fit the bearing being removed, in addition the same collet incorporates an upper threaded section to allow the removal sleeve to easily and precisely fit to the collet while at the same time the threaded removal sleeve securely keeps the collet together and properly aligned with the bearing and shaft axis to provide easy and accurate operation. Another design integrated into my puller is the ball thrust bearing on the end of the pressure or removal screw. This anti-friction thrust bearing eliminates undue friction and provides very free rotation of the pressure screw.

12 Claims, 4 Drawing Sheets

BEARING PULLER

RELATED APPLICATIONS

The present application is a continuation application of U.S. provisional patent application Ser. No. 61/065,651, filed Feb. 14, 2008, for BEARING PULER, included by reference herein and for which benefit of the priority date is hereby claimed.

FIELD OF THE INVENTION

The present invention relates to an improved puller that will provide a safe and efficient manner and tooling to remove bearings, bushings and gears.

BACKGROUND OF THE INVENTION

Bearings & bushings are widely used in many mechanical applications and require routine maintenance and/or replacement to prevent failure and to keep the mechanisms operating at optimum levels of performance. Although we have been using these anti-friction bearings and bushings for many years the maintenance and normal wear and tear present certain problems due to the size and space restrictions placed on them by engineering standards and design limitations from different manufactures on the mechanical devices and machinery they design that use bearings and bushings. Assembled bearings and/or bushings are typically pressed into a machined bore or recess, or onto the outside diameter of a shaft. The removal of the bearing, bushing, or gear, etc is determined by present day pullers and extractors designed to grip the inner race of a bearing or inside diameter of a bushing with puller jaws, split or blind hole collets, or special jaws that grip the inside bearing raceways on the inner race and outer race where the balls rotate. A pressure screw or slide hammer with a threaded rod is used as the force to remove the bearing etc. Bearings and gears mounted on shaft outside diameters are also removed by means of jaw type pullers or split collet pullers that rely on either a threaded t-bar, threaded flange or disc or slide hammer type pullers. Due to the design of these pullers the assembled puller may be out of alignment with the central axis of the bearing, bushing, or gear etc that is being removed due to the fact that the t-bar design may easily be installed inefficiently if the bolts threaded into the bearing separator or collet are not drawn down evenly and the t-bar or flange will be at an angle to the central axis of the bearing mount or bore. This will introduce excessive friction and resistance to the bearing being removed and may damage the component the bearing is being removed from. Another problem with theses designs is that they take much room to be assembled to the bearings or bushings etc and sometimes there is very limited room to work. There are no designs that will allow quick and secure assembly and at the same time offer the self aligning characteristics of my invention as well as the fact that my invention will fit in much closer and tighter spaces easily without the need for typical puller arms that require extra room to be installed and function.

There are other pullers on the market and most of them use puller jaws to grip the bearing or bushing being removed. Some examples would be your standard Snap-On CG253 3 jaw puller, the Snap-On CJ82B bar type puller. Proto brand J4036 jaw type puller shares much of the same design features as the Snap-On puller. Another type puller such as the one outlined in U.S. Pat. No. 4,977,661 is a split sleeve puller that requires another outer sleeve to hold it together during operation and also this design does not have wrench flats to assist with holding the work from rotating during operation.

The removal of the bearing, bushing, or gear, etc is determined by present day pullers and extractors designed to grip the inner race of a bearing or inside diameter of a bushing with puller jaws, split or blind hole collets, or special jaws that grip the inside bearing raceways on the inner race and outer race where the balls rotate. A pressure screw or slide hammer with a threaded rod is used as the force to remove the bearing etc. The referenced jaw type, bar type, and split sleeve pullers all have a pressure screw that creates friction may also create undue wear on the component it is applied against since there is no provision for a thrust bearing. The end of the pressure screw has a pointed or flat adapter that presses against the bearing shaft. The adapter then is fit into the end of the pressure screw and may allow the pressure screw to rotate while the adapter is stationary but this method creates undue friction and stress since there are no anti-friction bearings involved. Another problem with the jaw and bar type pullers is that they require a large clearance area around the bearing and surrounding assembly.

SUMMARY OF THE INVENTION

In accordance with the present invention, there is provided . . . a novel and improved puller that provides a safe and efficient manner and tooling to remove bearings, bushings, gears, etc. The invention is simple and highly efficient is its design and use due to incorporating multiple design elements into the main collets or bearing adapters. My present invention uses a simple split collet machined accurately to precisely fit the bearing being removed, in addition the same collet incorporates an upper threaded section to allow the removal sleeve to easily and precisely fit to the collet while at the same time the threaded removal sleeve securely keeps the collet together and properly aligned with the bearing and shaft axis to provide easy and accurate operation. Once assembled you have a robust and centrally aligned tool which easily removes the bearing or bushing. Another design integrated into my puller is the ball thrust bearing on the end of the pressure or removal screw. This anti-friction thrust bearing eliminates undue friction and provides very free rotation of the pressure screw.

It would be advantageous to provide a . . . one piece designed and machined collet that is then split and kept in a matched set so that you have a very accurate and precise tool that precisely fits the bearing to assure the assembled puller is in precise alignment to the axis of the shaft.

It would also be advantageous to provide a . . . secure and safe assembled puller assembly that can not slip off of the bearing or introduce any misalignment during the removal operation.

It would further be advantageous to provide a . . . secure and close fitting puller assembly that will allow access to bearings that are very difficult to remove with conventional jaw type pullers.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figures 1, 2, 3, 14:
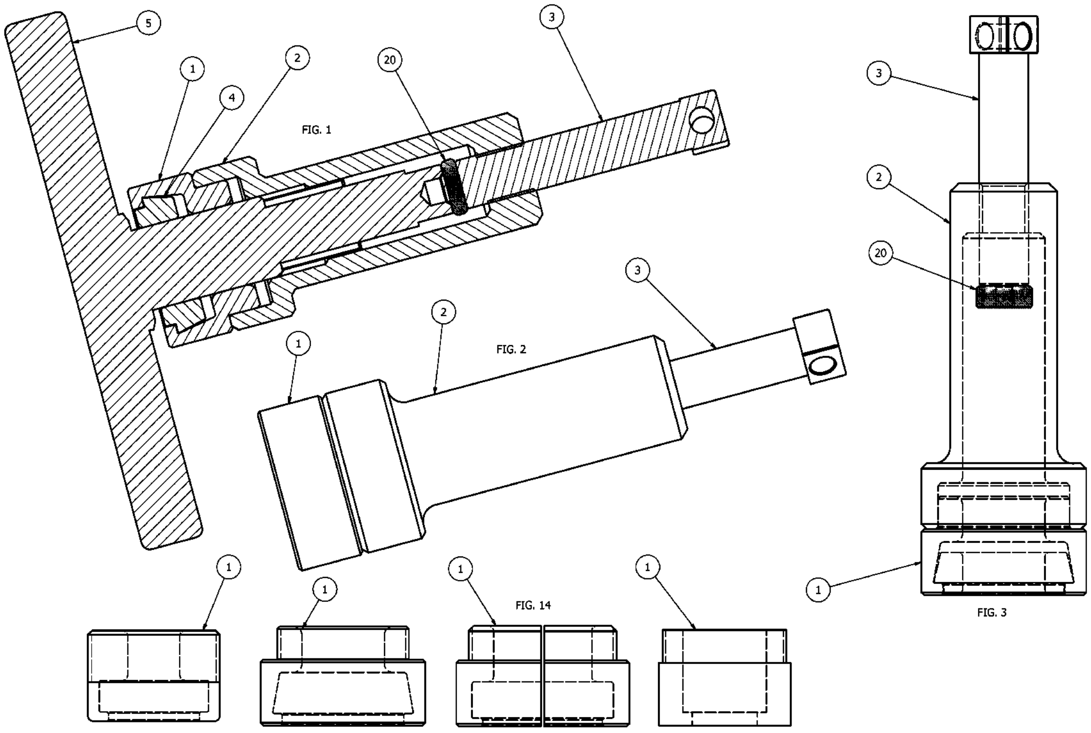
FIG. 1 is a section view of a typical cone bearing application on a motorcycle crankshaft (or flywheel) with the puller attached and in the pulling run. you will notice that the bearing has started to move from its seat.
FIG. 2 is a view of the bearing puller assembled for compact storage.
FIG. 3 is a view of the assembled puller with hidden lines showing to illustrate the tool.
FIG. 14 is section view of a pluarility of collet sizes.
Figure 6:
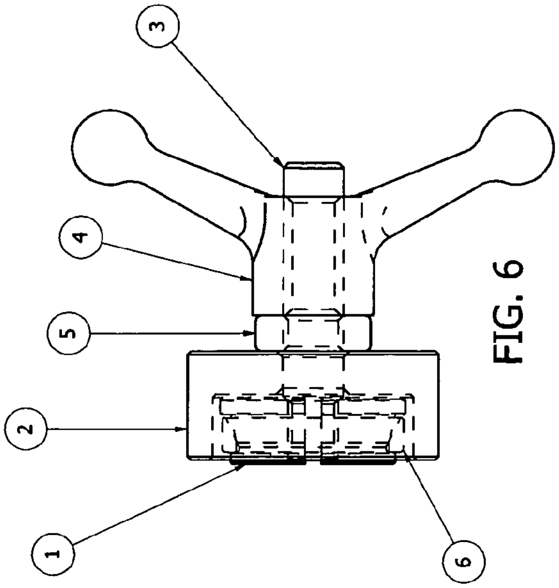
FIG. 6 is a view of the outer bearing race tool assembly with a bearing race extracted from its bore and resting in the bearing receiver cup.
Figure 4:
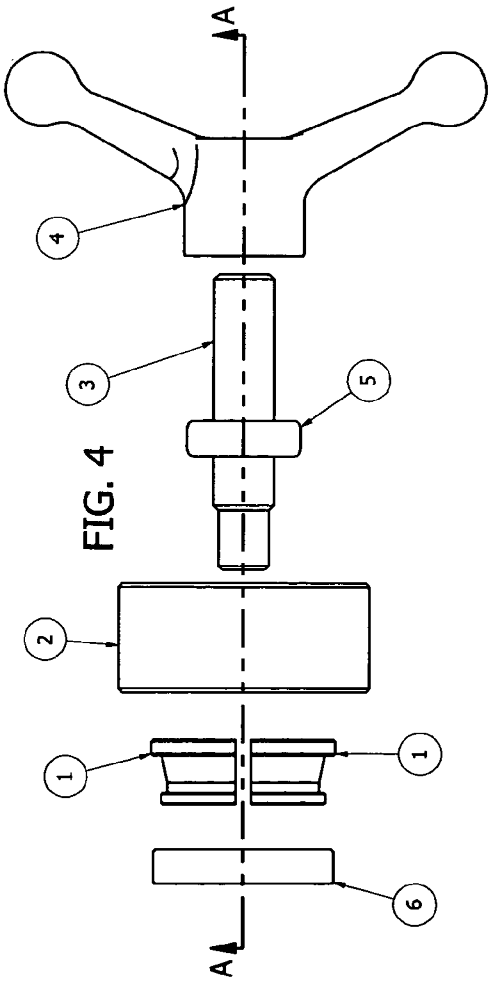
FIG. 4 is an exploded view of the outer bearing race removal tool assembly.
Figure 5:
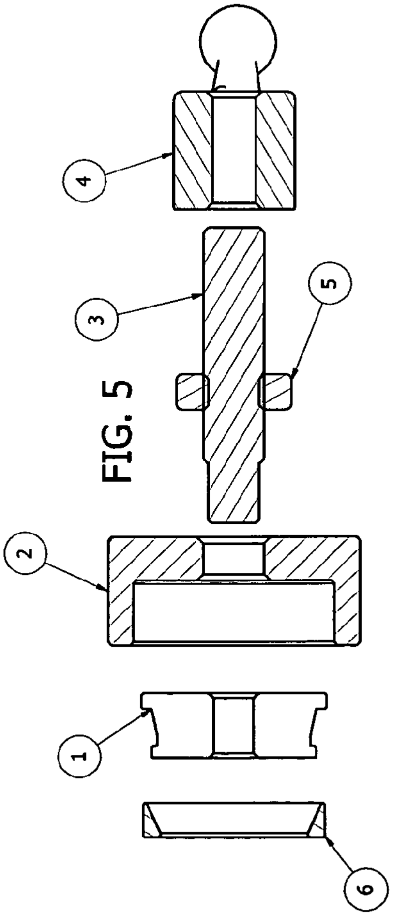
FIG. 5 is a section view of the outer bearing race removal tool assembly.
Figure 8:
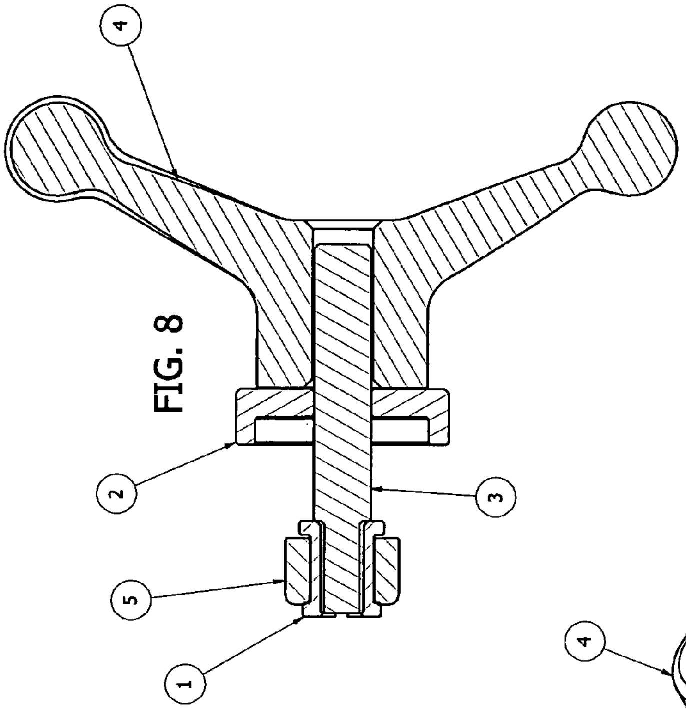
FIG. 8 is a section view of the straight bore bearing/bushing removal tool assembly.
Figure 9:
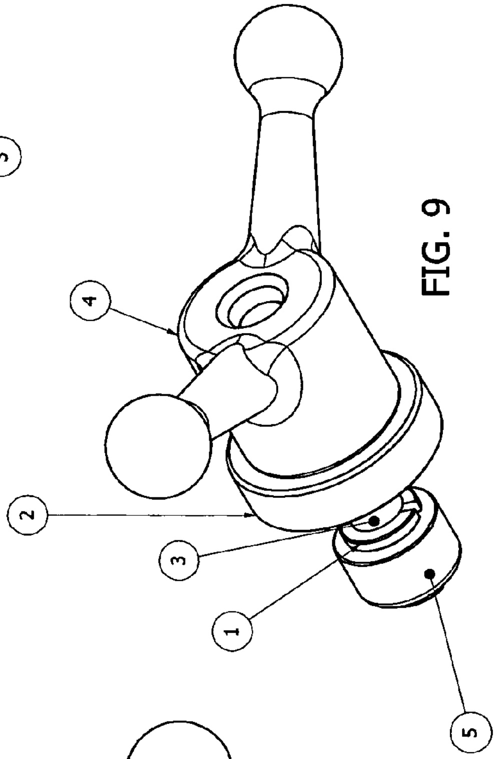
FIG. 9 is an orthographic view of the straight bore bearing/bushing removal tool assembly.
Figure 7:
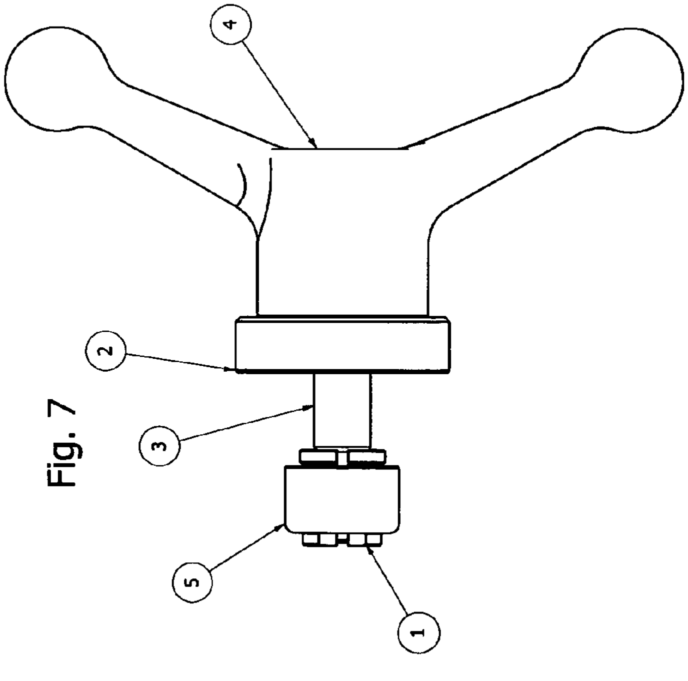
FIG. 7 is a side view of the straight bore bearing/bushing removal tool assembly with a bushing securely gripped by the collet.
Figure 10:
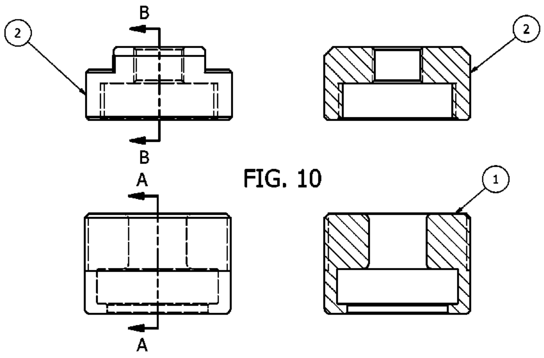
FIG. 10 is a side & section view of the straight race bearing/bushing removal tool design used on a typical ball or roller bearing application installed on short shafts.
Figure 11:
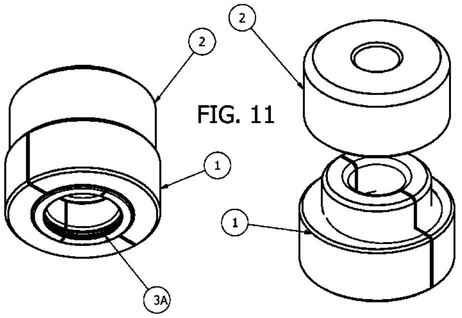
FIG. 11 is a set of orthographic views of the puller assembled with an inner adapter for pulling bearing races with support washers.
Figure 12:
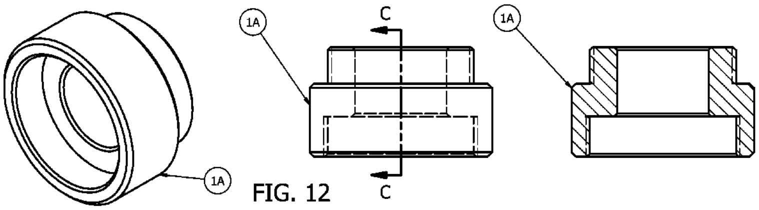
FIG. 12 is an orthographic view, side view with hidden lines, and section view of an extension sleeve to extend the range of the pullers depending on shaft length.
Figure 13:
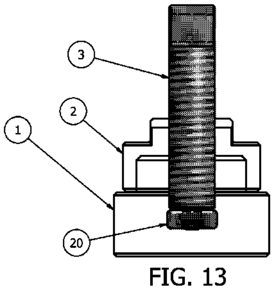
FIG. 13 is side view of alternative embodiment of the bearing puller assembly on a short shaft.

Referring to FIG. 4, I have a split collet 1 that by design accomplishes several tasks at once. The inside bore of the collet 1 is threaded to accept the removal screw 3 (pressure screw 16) that expands the collet 1 to the inside bore of the bearing 6 or bushing for a secure slip free fit. Since the split collet 1 is threaded the removal screw 3 will bottom out on the top flange of the collet 1 thereby aligning the upper flange halves on the same plane. The collet 1 and screw 3 now are secure and centrally affixed to the bearing axis. The common problem of present day split collet 1 designs is eliminated. This problem is as follows, a tapered expander rod and tapered ID or ball and ramp design allows a pivot point that lets the collet 12 flange pivot inward and slips right out of the bearing ID as pressure is applied, usually by the force of a slide hammer which introduces a shocking mechanism to further advance the problem of pulling the collet 1 right out of the bearing bore. The designs of my collets completely eliminate this fault. When the removal screw 3 is threaded into the collet 1 the radial movement of the collet 12 becomes restricted by the screw threads and the ID of the bearing 6 thereby providing a solid collet 1 to pull the bearing with evenly applied force. Alternatively, the removal screw 3 has a thrust bearing 20 By designing collets to the standard ANSI & DIN inch and metric dimensions I can assure this slip free fitment. Most of the split collets on the market are designed to be used on several size bearings each, this also contributes to the problem associated with theses designs. A kit could be made with having my puller and set of plualality of different sized collets. Even using a slide hammer with my designs you can't pull the collet 1 out of the bearing unless you were to break the flange off the collet 1. Present split collet 1 pullers on the market can allow the bearing or bearing race to tilt of center or away from the axis of the bearing and shaft or bore, this introduces extra resistance to overcome before the bearing can be extracted. This is especially true if a slide hammer is used since it is very difficult to hold it true to the bearing axis during its use. By using a receiver cup 2 with my design the bearing 6 is always removed straight with as little force as possible. This constant pressure by using a receiver cup 2 and flanged nut or t-handle 4 with thrust bearing 20 assures the process is smooth and efficient. FIG. 6 shows the bearing race 6 removed and secured in the receiver 2. This is also much safer that using the slide hammer. The "safe-raceway" outer race collet 1 incorporates a straight portion to align the bearing raceway axis central to the collet 1 and a tapered portion extending to the removal flange of the collet 1 pair that's increases the strength of the collet 1. I would claim that I have simplified the design and function of an awkward process of bearing maintenance. FIG. 7 shows the straight bore collet 1 design inserted into a bushing 5 with the threaded expander rod 3 securely inserted into the collet 1 ready to be extracted by placing the receiver 2 on the mounting face of the bushing 5 bore and turning the t-handle 4 on the threaded extractor rod 3 to force the bushing 5 from its bore. FIG. 10 shows a straight bearing collet 1 and removal sleeve 2. FIG. 8 shows the assembled puller (1&2) with a bearing inner race support washer adapter 3 installed, this allows the tool to remove an inner race installed on top of a support washer by gripping the washer under the race. This adapter design eliminates the cost making separate collets 1 for every application. It is also my intent to claim the benefit of the adapter 3 design, this I feel is invaluable to the integrity of a complete tool set that would cover many different sizes and shapes of bearings as shown in FIG. 14, as well as different mounting techniques. FIG. 12 shows item 1A which is an extension sleeve to extend the range of the pullers depending on shaft length. FIG. 1 shows a section view of a typical tapered roller bearing 4 installation on a flywheel 5. The tapered bearing collet 1 is placed around the bearing 5 to grip the flange or bearing retainer cage. Next the removal sleeve 2 is threaded onto the threaded collet 1 to form a solid assembly around the bearing 4. The removal sleeve 2 is designed to fit the bearing 4 mounting shaft with a close machined fit with minimum clearance. This helps align the collet 1 and removal sleeve 2 to the axis of the bearing 4. The threaded pressure screw 3 is threaded into the removal sleeve 2 and upon reaching the flywheel 5 shaft nose it is centered to the shaft axis. As the screw 3 is rotated and threaded into the sleeve 2 it forces the removal sleeve 2, collet 1, & bearing 4 up and off of the shaft with minimum pressure. To be more detailed about the collet 1 design I would like to point out several features of the tool assembly. The collet 1 is designed with a tapered ID to increase the strength of the tool and assure close fitment of all the components. We now can have a precision puller assembly instead of a loose fitting and/or mis-aligned puller that introduces excessive friction and an unsafe work practice. By utilizing the bearing 4, the bearing shaft OD dimensions, and the center or nose of the shaft as working and alignment surfaces we can control the precise movement and operation of the puller assembly to assure constant and repeatable operation every time. This was not possible with other designs that have no alignment bearing surfaces. I have incorporated in the collet 1 designs radiused edges instead of chamfers as yet another method of eliminating any undue friction and any sharp edges that may damage the components. I would like to point out this novel design is unique and clearly focuses on a safe, efficient, and reliable method of removing straight bearings/bushings, tapered bearings and races, inner bearing races, mounting washer, gears, and other cylindrical components from open, blind, recessed, counter-bored, or flanged mountings just to name the most common. Safety and reliability, with ease of use are a few of the major benefits of my puller set. I wish to patent my puller set to include and cover the internally threaded collet 1 design for internal straight bores as shown in FIG. 4 item 1 & the threaded "safe-raceway" design tapered collet 1 as shown in FIG. 7 item 1. These collets may be manufactured as one piece with split internally threaded or two piece as I have illustrated with FIGS. 4 & 7, item 1. To include the tapered bearing and straight bearing removal collets as illustrated in FIGS. 1 & 10, item 1. To include the split adapter rings as illustrated in FIG. 11, item 3. The split adapter design may also be used to remove a tapered bearing inner cone race that the bearing retainer has shattered or been destroyed. This split adapter would simulate the inner cone race, roller bearings, and bearing cage to fit inside the collet 1 and securely grip the inner race for removal. This is another time safe and efficient design to assist with bearing maintenance and reduce any damage to the surrounding components.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A bearing puller apparatus for removal of bearings and bushings from shafts and housings, said bearing puller apparatus comprising:

a threaded screw including a head at a first end and a bearing at a second end;

a tube having a threaded aperture at a first end for receiving said threaded screw with said bearing movable inside said tube and said tube further comprising a cup portion at a second end of said tube with a larger diameter and an inner fastening mechanism;

and a collet comprising a recessed portion at a first end with an outer fastening mechanism mating with said cup potion's said inner fastening mechanism wherein said collet includes an inner diameter in side said first end and a second greater inner diameter inside a second end with said collets first end recess forming a flange contacting said second end of said cup portions and aligning an outer diameter of second end of said collet axially with said second end of an outer diameter of said cup portion.

2. The bearing puller apparatus according to claim 1, wherein said cup portion inner fastening mechanism and said collet outer fastening mechanism are both threaded.

3. The bearing puller apparatus according to claim 1, wherein said bearing on said second end of said threaded screw is a thrust bearing.

4. The bearing puller apparatus according to claim 2, wherein said collet is further comprising a plurality of collets each having different sized dimensions to fit a variety of different sized said bearings and said bushings.

5. The bearing puller apparatus according to claim 1, wherein said head of said threaded screw having an aperture.

6. The bearing puller kit apparatus according to claim 4, wherein said plurality of each said collets' outer inner diameter at said first end is threaded.

7. A bearing puller kit for removal of bearings and bushings from shafts and housings, said bearing puller apparatus comprising:

a threaded screw including a head at a first end and a bearing at a second end;

a tube having a threaded aperture at a first end for receiving said threaded screw with said bearing movable inside said tube and said tube further comprising a cup portion at a second end of said tube with a larger diameter and an inner fastening mechanism;

and a plurality of different sized collets each comprising a recessed portion at a first end with an outer fastening mechanism mating with said cup potion's said inner fastening mechanism wherein said collet includes an inner diameter in side said first end and a second greater inner diameter inside a second end with said collets first end recess forming a flange contacting said second end of said cup portions and aligning an outer diameter of second end of said collet axially with said second end of an outer diameter of said cup portion.

8. The bearing puller kit apparatus according to claim 7, wherein said cup portion inner fastening mechanism and said plurality of each said collet outer fastening mechanism are both threaded.

9. The bearing puller kit apparatus according to claim 7, wherein said bearing on said second end of said threaded screw is a thrust bearing.

10. The bearing puller kit apparatus according to claim 7, wherein said head of said threaded screw having an aperture.

11. The bearing puller kit apparatus according to claim 8, wherein said plurality of each said collets' outer inner diameter at said first end is threaded.

12. A bearing puller apparatus for removal of bearings and bushings from shafts and housings, said bearing puller apparatus comprising:

a threaded screw including a head at a first end and a bearing at a second end;

a tube having a threaded aperture at an elongated first end for receiving said threaded screw with said bearing movable inside said tube and said tube further comprising a cup portion at a second end of said tube with a larger diameter and an inner fastening mechanism;

and a collet comprising a recessed portion at a first end with an outer fastening mechanism mating with said cup potion's said inner fastening mechanism wherein said collet includes an inner diameter in side said first end and a second greater inner diameter inside a second end with said collets first end recess forming a flange contacting said second end of said cup portions and aligning an outer diameter of second end of said collet axially with said second end of an outer diameter of said cup portion.

* * * * *